United States Patent
Salminen et al.

(10) Patent No.: US 8,124,146 B2
(45) Date of Patent: Feb. 28, 2012

(54) FERMENTED FOOD PRODUCT

(75) Inventors: Kari Salminen, Helsinki (FI); Ville Kauppinen, Turku (FI); Tarja Virtanen, Huhmari (FI); Sirpa Rajaniemi, Tampere (FI); Eeva-Liisa Ryhänen, Helsinki (FI)

(73) Assignee: Elixi Oil Oy, Somero (FI)

( * ) Notice: Subject to any disclaimer, the term of this patent is extended or adjusted under 35 U.S.C. 154(b) by 531 days.

(21) Appl. No.: 12/225,304

(22) PCT Filed: Mar. 19, 2007

(86) PCT No.: PCT/FI2007/050149
§ 371 (c)(1),
(2), (4) Date: Jan. 10, 2009

(87) PCT Pub. No.: WO2007/107638
PCT Pub. Date: Sep. 27, 2007

(65) Prior Publication Data
US 2010/0203194 A1   Aug. 12, 2010

(30) Foreign Application Priority Data
Mar. 20, 2006   (FI) ..................................... 20065182

(51) Int. Cl.
*A23L 1/16* (2006.01)
(52) U.S. Cl. .............................. 426/44; 426/629; 426/61
(58) Field of Classification Search ................... 426/44, 426/629, 61
See application file for complete search history.

(56) References Cited

U.S. PATENT DOCUMENTS

| 949,416 A | 2/1910 | Davis, Jr. |
| 4,857,326 A * | 8/1989 | Stitt .............................. 424/768 |
| 6,548,057 B1 * | 4/2003 | Shimakawa et al. ......... 424/93.4 |
| 2004/0058051 A1 * | 3/2004 | Yunusov et al. .............. 426/626 |

FOREIGN PATENT DOCUMENTS

| CA | 2383021 A1 | 10/2002 |
| DE | 3905055 A1 | 8/1990 |
| DE | 10219684 A1 | 11/2002 |
| EP | 0111420 A2 | 6/1984 |
| EP | 1629723 A1 | 3/2006 |
| GB | 191219462 A | 1/1913 |
| GB | 2120520 A | 12/1983 |
| WO | WO-91/17672 A1 | 11/1991 |
| WO | WO-97/35594 A1 | 10/1997 |
| WO | WO-2005/107777 A1 | 11/2005 |

OTHER PUBLICATIONS

Dipak K.D. et at, Journal of the Science of Food and Agriculture 1986, vol. 37, No. 2, pp. 199-205.
Mukhopadhyay N et al., Journal of Applied Ichthyology, 2001, vol. 17, No. 5, pp. 220-226.

* cited by examiner

*Primary Examiner* — D. Lawrence Tarazano
*Assistant Examiner* — Hamid R Badr
(74) *Attorney, Agent, or Firm* — Birch, Stewart, Kolasch & Birch, LLP

(57) ABSTRACT

The present invention relates to a fermented food product, which comprises defatted flax-seed as main raw material. Suspension of defatted crushed flaxseed or crushed and milled flaxseed, optionally supplemented with other cereals or plant seeds or flaxseed fractions, is fermented by a starter culture which comprises probiotic bacteria, and seasoned and stabilized, whereby a spoonable or thinkable fermented snack product is obtained.

11 Claims, No Drawings

FERMENTED FOOD PRODUCT

FIELD OF THE INVENTION

The present invention pertains to the field of food technology and relates to fermented food products based substantially on flaxseed. The products are nutritionally beneficial and beneficial to health, containing living or killed microorganisms, in specific probiotic bacteria. Suspension of defatted crushed flaxseed or defatted crushed finely milled flaxseed, optionally supplemented with other cereals or plant seeds or flaxseed fractions, is fermented by a starter culture which comprises probiotic bacteria, whereby a spoonable or drinkable fermented low-fat snack product is obtained.

BACKGROUND OF THE INVENTION

Flaxseed has been traditionally used in Finland and in many other countries in nutrition and also in folk medicine. Flaxseed is a versatile source of nutritious substances and bioactive compounds. Linseed oil comprises plenty of polyunsaturated fatty acids, and the amount of α-linolenic acid (ALA) is more than half of the total amount of the fatty acids. Flaxseed is also rich in high quality protein and dietary fibre, wherein the proportion of soluble fibre is 20-40%. The amount of lignans, which form a defensive mechanism in plants, is up to 100-1000 times higher in flax than in other edible plants. According to various studies, α-linolenic acid, which is an omega-3 fatty acid, has advantageous health effects. In addition to useful compounds, flaxseed also contains potential detrimental compounds, as e.g. cyanogenic glycosides and cadmium. However, these do not cause health risks as long as recommendations for use are followed.

The outermost layer of flaxseed is called mucin, which mainly forms the so called soluble fibre fraction. The amount of mucin is 4-8% of the weight of the seed. Mucin affects the functional characteristics of flaxseed. When mixing crushed flaxseed with water, mucin forms slimy sediment, which may have detrimental effects on the fermentation procedure, and the product itself.

Fermentation, also called souring, is a traditional preservation method, which can be used to improve the shelf life and digestability of the product and the bioavailability in the gastrointestinal tract of the compounds included in the plants. The souring process may be carried out by spontaneous fermentation or, alternatively, by fermentation using starters.

Commercial starters are available and, in addition, lactic acid bacterial strains isolated from various organic sources may be exploited in fermentation. It is also possible to use probiotic lactic acid bacteria in fermented plant products.

WO publication 2005/107777 discloses a product for weight control based on whole flax-seed. It is mentioned that the composition of the invention may be processed by, e.g., fermentation. DE patent application No. 39 05 055 A1 describes a cereal product fermented using lactobacilli. Flaxseed is mentioned in the list of cereals which can be used as raw material.

U.S. Pat. No. 4,857,326 discloses a stable nutritive and therapeutic flaxseed composition, "dry fortified ground flax seed", which contains vitamin B-6 and zinc ions, methods of preparing the same and therapeutic methods for employing such compositions. The composition is prepared from whole flaxseed, which has not been defatted. Preparation of "flax yogurt" is described, in which the composition is fermented by a "standard yogurt culture".

While fermented cereal products containing live lactic acid bacteria are known (e.g. EP 0 568 530), and fermentation of flaxseed-based material is suggested (e.g. WO 2005/107777), there is no such tasty, ready-to-eat spoonable or drinkable snack product available, which would comprise defatted crushed flaxseed fermented by probiotic bacteria.

SUMMARY OF THE INVENTION

The primary object of the present invention is a fermented flaxseed-based food product, which has been prepared by a process which comprises the steps of deffating the flaxseed, crushing or crushing and milling the defatted flaxseed so obtained, mixing the crushed or crushed and milled flaxseed so obtained with water to obtain a suspension, fermenting the suspension by a starter culture comprising at least one bacterial strain selected from the group consisting of lactic acid, propionic acid and bifidobacteria having probiotic characteristics, and seasoning and stabilizing the fermented suspension. The defatted crushed or crushed and milled flaxseed is mixed with water at a concentration of about 3 to about 8% (w/w). Using crushed and milled flaxseed at a concentration of about 5% is preferred.

Another object of the invention is a fermented flaxseed-based food product, in which the crushed or crushed and milled flaxseed is supplemented with other cereals or plant seeds, e.g. oat, buckwheat or soy. In addition, the crushed or crushed and milled flaxseed may also be supplemented with any flaxseed fraction having advantageous effects.

The food product of the present invention may be in the form of a spoonable snack product, i.e. a product suitable for eating with spoon. A further object of the invention is a drinkable flaxseed product. Flaxseed drink is obtained by filtering fermented flaxseed suspension.

After fermentation the suspension is seasoned with, e.g. suitable berries, jams, juices or fruit, and/or natural or artificial flavours or aromas. The structure of the fermented and seasoned suspensions may be improved using stabilizers conventional in the art, such as pectin, guar gum and xanthan gum, or cellulose.

DETAILED DESCRIPTION OF THE INVENTION

Defatted crushed flaxseed is used as the main raw material for the products of the present invention. For the purposes of this invention defatting of flaxseed is preferably carried out by cold-pressing. It is also possible to remove the oil from the seeds by solvent extraction, using, e.g. hexane, or with supercritical extraction by using $CO_2$. After defatting the seed cake is crushed to obtain crushed flaxseed. The crushed flaxseed may subsequently be milled to obtain crushed and milled flaxseed. The fat content of the material to be used in this invention, i.e. "crushed flaxseed" or "crushed and milled flaxseed", may vary from about 1% to about 17%, preferably about 14% to about 17%, and the sugar content is about 2%, most of which is usually sucrose. Since this sucrose concentration is fairly low for fermentation, it is advisable to add sugar, e.g. glucose, before the fermentation step.

It should be noted that the flaxseed used for the purposes of this invention is always first defatted. Consequently, the term "crushed flaxseed", as used herein, means flaxseed crush which has been prepared by defatting the flaxseed, preferably by cold-pressing the flaxseed to remove the oil, and then crushing the seed cake, preferably by spiral conveyor, hammer mill and sift. Furthermore, the term "crushed and milled flaxseed", as used herein, means flaxseed meal which has been prepared by defatting the flaxseed, preferably by cold-pressing the flaxseed to remove the oil, and then crushing the seed cake, preferably by spiral conveyor, hammer mill and sift, and finally, milling the flaxseed crush, preferably by a stone mill. As used in the present specification and claims, the term "crushed or crushed and milled flaxseed" thus covers both of the terms "crushed flaxseed" and "crushed and milled flaxseed", which have the above meanings. It should also be noted that whenever flaxseed is mentioned herein in respect of this invention, defatted flaxseed is meant.

For preparing the emulsion to be fermented, it is advisable to use about 3 to about 8 grams of crushed or crushed and milled flaxseed per 100 g of water. A preferable concentration is about 5%.

In addition to flaxseed, the raw material used may also comprise any other cereals or plant seeds. For instance, crushed or milled oat, buckwheat and/or soy may be used. Further, crushed or crushed and milled flaxseed may also be supplemented with flaxseed fractions having advantageous effects, for instance flaxseed-derived lignans, proteins or dietary fibres.

Mixtures of flaxseed and the supplementary materials may contain, for instance, from 60 to 80% of flaxseed and 20 to 40% of other cereals, plant seeds or flaxseed fractions. When adding buckwheat to the mixture, its amount may vary from 5 to <10% calculated from the total weight of the mixture. The concentration of the flour mixture in the water suspension may vary from about 3 to about 8%, and it is preferably about 5%.

Unless otherwise specified, all percents, ratios and parts, etc. given in the present specification are by weight.

The starter or starter culture used for fermentation in preparing the product of the present invention may contain any suitable starter bacteria appropriate for fermentation of food products. In a preferred embodiment of the invention the starter comprises a probiotic bacterial strain or a mixture of probiotic bacteria.

Probiotic bacteria have been defined to be live microorganisms which when administered in adequate amounts confer a health benefit on the host. However, it should be noted that it is not necessary for a bacterium to be alive in order to have probiotic characteristics. Consequently, killed bacteria or microbial cell preparations or components of microbial cells that have beneficial effect on the health and well-being of the host may also have probiotic characteristics and may be used for the purposes of the present invention. The products of the present invention may thus contain live or killed probiotic bacteria or, alternatively, cell preparations or components of microbial cells as mentioned above. Besides being nutritionally beneficial, the fermented products of the present invention are thus also beneficial to health.

The starter thus comprises, for instance, lactic acid, propionic acid or bifidobacteria having probiotic characteristics, or a mixture of such bacteria. The lactic acid bacteria may belong to the species *Lactobacillus acidophilus, Lb. rhamnosus, Lb. plantarum, Lb. paraplantarum, Lb. fermentum, Lb. casei, Lb. paracasei* and *Lb. salivarius*. Other suitable lactobacilli may also be used.

Bifidobacteria used are preferably selected from the species *Bifidobacterium lactis, B. longum* and *B. bifidum*. Any other suitable bifidobacteria may also be used.

Propionic acid bacteria may also be used in the starter for the purposes of the present invention. *Propionibacterium freudenreichii* and other suitable propionic acid bacteria having probiotic characteristics may be used.

A preferable *lactobacillus* is *Lactobacillus rhamnosus* GG (ATCC 53103). A preferable *bifidobacterium* is *Bifidobacterium lactis* Bb12.

Advantageously, mixtures of bacteria may be used as the starter for fermentation. The most preferable mixture comprises the strains *Bifidobacterium lactis* Bb12 and *Lactobacillus rhamnosus* GG (ATCC 53103). This mixture may be supplemented by either *Lactobacillus rhamnosus* LC-705 or *Lactobacillus acidophilus* LA-5.

Seasoning of the product may be carried out using berries, jams, juices or fruit, and/or natural or artificial flavours or aromas. Suitable berries are, e.g. blueberry, lingonberry, blackcurrant, cranberry, raspberry, strawberry, sea buckthorn, rose hip and aronia. Any other berries or any suitable fruit may also be used. It is usually necessary to sweeten the berries with sugar. The amount of sugar added is within the expertise of a skilled artisan.

Seasoning with mashed berries improves the structure of the product. However, the fermented suspensions tend to separate, i.e. the coarse fraction settles down onto the bottom. Therefore it is necessary to use stabilizers when preparing the snack product of the present invention using the fermented and seasoned emulsion. All conventional stabilizers acceptable for food products, such as pectin, guar gum, xanthan gum and cellulose may be used, alone or in combinations.

As indicated above, flaxseed contains mucin, which consists of sour and neutral polysaccharides, protein, ashes and fat. In higher amounts mucin causes slimy structure in water solutions. To study how to avoid sliminess, we tried to split mucin in a suspension of 10% of flaxseed flour in water using hydrolase and protease enzymes. The enzymes tested were β-amylase, α-amylase, amyloglucosidase and a few different proteases. However, it was found that neither the enzymes alone nor mixtures thereof were effective in decreasing the viscosity, but the suspension remained viscose and slimy.

In the experiments it was surprisingly found that it was not necessary to use enzymes to split mucin, but merely optimizing the concentration of flaxseed in the water suspension was sufficient to avoid sliminess. It was found that using about 5 g of flaxseed flour per 100 g of water the slimy mouthfeel caused by mucin could be totally prevented. Further, more, in this concentration the taste of flaxseed was found to be pleasant, not too strong, but typical to the material. In addition, the concentration of cadmium included in flaxseed does not exceed the recommended daily supply, when ingested moderately.

EXPERIMENTAL

Example 1

Primary Fermentation Studies

In the primary study Various *Lactobacillus acidophilus, Lb. rhamnosus, Lb. plantarum* and *Lb. fermentum* strains, as well as *Bifidobacterium* strains were tested. Fermentation tests were carried out using crushed or crushed and milled flaxseed as defined above, in the concentration of 10% (w/w). However, while fermenting as such was successful with all of the strains, the 10% suspension used was slimy and very viscous. With most of the strains the number of bacteria after 24 h incubation at 37° C. was $10^8$ to $10^9$ cfu/ml, and pH was under 4.0.

Due to the undesirable characteristics of the 10% suspension (sliminess, high viscosity), 5% suspension of crushed and milled flaxseed was subsequently tested using the strain *Lactobacillus plantarum* 80 TNO (Lactrys Biopharmaceuticals BV, Leiden, The Netherlands). In this study the necessity of added sugar was evaluated as well. The result of the fermentation is depicted in Table 1 below. The test showed that 5% suspension is suitable for fermentation.

TABLE 1 pH and sensory evaluation of 5% suspension of crushed and milled flaxseed when fermenting by Lb. plantarum 80 TNO starter strain with and without added sugar.

| Starter strain | pH | Taste | Structure |
|---|---|---|---|
| Lb. plantarum 80 TNO | 4.40 | mild flaxseed, pure, fresh | water phase separating, not slimy, liquid |
| Lb. plantarum 80 TNO + 1.5% glucose | 3.52 | very sour, mild, pure, fresh | water phase separating, not slimy, liquid |

Example 2

Supplementary Fermentation Studies

Subsequently, various further starter strains and starter strain mixtures were tested to find an optimal starter for fermenting flaxseed. Since it is advisable that the product contains live probiotic bacteria, one of the tested strains was the known probiotic *Bifidobacterium* lactis Bb12.

Strains used in the studies were the following:

*Bifidobacterium lactis* Bb12 (Chr. Hansen, Hørsholm, Denmark)

*Lactobacillus acidophilus* LA-5 (Chr. Hansen, Hørsholm, Denmark)

*Lactobacillus rhamnosus* LC-705 (DSM 7061) (Valio Oy, Helsinki, Finland)

*Lactobacillus plantarum* Vege-Start 60 (Chr. Hansen, Hørsholm, Denmark)

*Lactobacillus plantarum* ETL1, isolated from sauerkraut (MTT, Jokioinen, Finland)

*Lactobacillus paraplantarum* ETL2 isolated from fermented cucumber (MTT, Jokioinen, Finland).

Starter strain mixtures were tested according to the following flow chart:

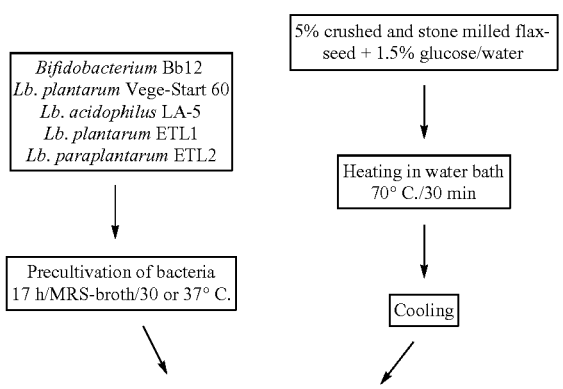
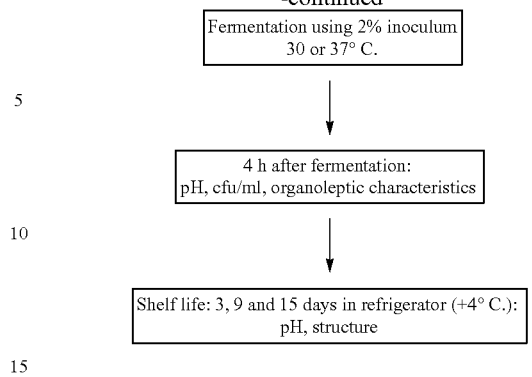

The strain mixtures tested were found suitable for fermentation of flaxseed, producing normal taste typical to flaxseed. In Table 2 below the results of the fermentation studies are given. The number of bacteria was calculated after 4-h fermentation. Sensory evaluation was carried out at the same time. The shelf life was monitored at +4° C. as the change of pH, pH being measured at the start and on days 3, 9 and 15.

TABLE 2

Starters and starter mixtures in fermenting suspension of crushed and milled flaxseed (5%)

| Starter mixtures | Bacterial count cfu/ml after 4-h fermentation | Sensory evaluation after 4-h fermentation | Sourness pH (+4° C.) |
|---|---|---|---|
| Bifidobacterium Bb12 + Lb. plantarum Vege-Start 60 | | Strong phase separation, no off-flavours | Start: 4.82<br>3 d: 3.83<br>9 d: 3.83<br>15 d: 3.75 |
| Bifidobacterium Bb12 + Lb. plantarum Vege-Start 60 + Lb. acidophilus LA-5 | | Strong phase separation, no off-flavours | Start: 4.69<br>3 d: 3.94<br>9 d: 3.85<br>15 d: 3.75 |
| Lb. paraplantarum ETL2 + Lb. acidophilus LA-5 + Bifidobacterium Bb12 | | Strong phase separation, bitter taste | Start: 4.85<br>3 d: 4.04<br>9 d: 3.90<br>15 d: 3.80 |
| Lb. plantarum ETL1 + Lb. acidophilus LA-5 + Bifidobacterium Bb12 | | Strong phase separation, no off-flavours | Start: 4.62<br>3 d: 3.94<br>9 d: 3.87<br>15 d: 3.69 |
| Lb. acidophilus LA-5 + Bifidobacterium Bb12 | | Strong phase separation, no off-flavours | Start: 4.52<br>3 d: 4.01<br>9 d: 3.88<br>15 d: 3.75 |
| Bifidobacterium Bb12 | $6.20 \times 10^6$ | Strong phase separation, sourless taste | Start: 6.22<br>3 d: 6.22<br>9 d: 6.25<br>15 d: 5.93 |
| Lb. plantarum Vege-Start 60 | $6.11 \times 10^8$ | Strong phase separation, no off-flavours | Start: 5.01<br>3 d: 4.17<br>9 d: 3.92<br>15 d: 3.83 |
| Lb. acidophilus LA-5 | $1.25 \times 10^7$ | Strong phase separation, sourless taste | Start: 5.52<br>3 d: 5.43<br>9 d: 5.33<br>15 d: 5.18 |
| Lb. plantarum ETL1 | $1.50 \times 10^6$ | Strong phase separation no off-flavours | Start: 5.03<br>3 d: 4.06<br>9 d: 3.90<br>15 d: 3.79 |
| Lb. paraplantarum ETL2 | $2.35 \times 10^8$ | Strong phase separation, no off-flavours | Start: 5.08<br>3 d: 4.11<br>9 d: 3.90<br>15 d: 3.80 |

The above fermentation studies showed that only one of the starter mixtures caused bitter taste into the product. Other mixtures acted well, producing normal taste typical to flaxseed. Two individual strains, *Bifidobacterium* Bb12 and *Lb. acidophilus* LA-5 grew very slowly, wherefore the pH of the product remained over 5.0 even after 15 days of cultivation, and thus the taste was characterized to be sourless (not sour enough).

To guarantee that the product contains live probiotic bacteria, it is advisable to use concentrated starter suspensions. Consequently, in our studies the *Bifidobacterium* Bb12 starter suspension was concentrated by centrifuging the precultured starter broth, and concentrated Bb12 inoculum was used in subsequent experiments.

We also studied if *Lactobacillus rhamnosus* LC-705 would be suitable for fermentation of flaxseed. Table 3 shows the change of pH during the fermentation, and when refrigerated, up to 21 days.

TABLE 3

Fermentation of suspension of crushed and milled flaxseed (5%) by *Lb. rhamnosus* LC-705, pH change during fermentation and when refrigerated

| | Fermentation time (37° C.) | | | | Refrigeration (4° C.) | | | |
|---|---|---|---|---|---|---|---|---|
| | 0 h | 2 h | 4 h | 6 h | 1 d | 5 d | 9 d | 14 d | 21 d |
| pH | 6.2 | 5.5 | 5.1 | 4.5 | 3.4 | 3.4 | 3.4 | 3.4 | 3.4 |

The results show that this starter strain grows well in flaxseed. However, pH of the product decreased quickly to 3.4 during refrigeration, which paces restrictions to the dosage of starter bacteria. If pH decreases too quickly, the dose of the bacteria is too high.

Example 3

Final Fermentation Studies

3A: Starter Mixture 1

From the strains tested in the supplementary studies a mixture of three strains was selected for the final studies. These strains were *Bifidobacterium lactis* Bb12, *Lactobacillus acidophilus* LA-5 and *Lactobacillus rhamnosus* LC-705. The ratios of the strains in the mixture were optimized so that pH did not lower too much after the fermentation, in order to guarantee the viability of the bifidobacteria. The pH was monitored for 2 to 3 weeks after the fermentation. Table 4 shows the effect of the mixture ratios on pH change during the 3-week monitoring period. Fermenting was carried out at 37° C. for 7 hours and the subsequent refrigeration at +4° C. up to 21 days.

TABLE 4

Effect on pH of the mixture ratios of *Bifidobacterium* Bb12, *Lb. acidophilus* LA-5 and *Lb. rhamnosus* LC-705 during the 3-week monitoring period.

| Starter mixture | | Fermentation (hours) | | | | | | Refrigeration (days) | | | | |
|---|---|---|---|---|---|---|---|---|---|---|---|---|
| | | 0 | 2 | 4 | 5 | 6 | 7 | 5 | 7 | 9 | 14 | 21 |
| 90% Bb12 5% LA-5 5% LC-705 | pH | 6.34 | 6.34 | 6.19 | 6.13 | 5.98 | 5.87 | 5.40 | 5.11 | 4.82 | 4.46 | 4.26 |
| 80% Bb12 10% LA-5 10% LC-705 | pH | 6.30 | 6.30 | 6.15 | 5.94 | 5.77 | 5.60 | 4.88 | 4.68 | 4.47 | 4.19 | 4.10 |
| 70% Bb12 15% LA-5 15% LC-705 | pH | 6.23 | 6.16 | 6.00 | 5.80 | 5.56 | 5.54 | 4.87 | 4.62 | 4.49 | 4.21 | 4.09 |
| 60% Bb12 20% LA-5 20% LC-705 | pH | 6.19 | 6.11 | 5.83 | 5.67 | 5.63 | 5.48 | 4.70 | 4.52 | 4.37 | 4.12 | 4.03 |

The best mixture ratio turned out to be 90% of *Bifidobacterium lactis* Bb12, 5% of *Lactobacillus acidophilus* LA-5 and 5% of *Lactobacillus rhamnosus* LC-705.

3B: Starter Mixture 2

Additional studies were carried out using a mixture of the strains *Bifidobacterium lactis* Bb12 (90%), *Lactobacillus rhamnosus* CG (5%) and *Lactobacillus rhamnosus* LC-705 (5%). The starter mixture and the flaxseed mixture were prepared as described in Example 2 (see the flow chart given therein). Briefly, the strains were precultivated for 14 h at 37° C. in MRS broth, and then passaged. The flaxseed mixture, prepared using 30 g of cold-pressed, crushed and stone milled flaxseed, 9 g of glucose and 600 ml of sterile spring water and heated at 70° C. for 30 minutes, was inoculated with a 2% inoculum of the starter mixture, and fermented at 37° C. for 7 h.

The pH of the flaxseed mixture was 6.44 prior to the fermentation, and 4.43 after the fermentation. After fermentation the mixture was supplemented with thawed and mashed frozen raspberries (15%), granulated sugar (6%) and 10 drops of raspberry essence. The flaxseed-raspberry product was packed to 2 dl cups, à 1 dl. The products were stored below 4° C. for three weeks. The amount of microbes and the pH value of the products were measured at days 1, 3, 7, 14 and 21. The results are given in Table 5 below.

TABLE 5

Microbial counts and pH of the product obtained by fermenting with starter mixture 2

| Day of analysis | Lactobacilli cfu/g | Yeast cfu/g | Fungi cfu/g | pH |
|---|---|---|---|---|
| 1 | $4.0 \times 10^8$ | 50 | 210 | |
| 3 | $3.3 \times 10^8$ | | | |
| 7 | $3.3 \times 10^8$ | 10 | <10 est | 3.84 |
| 14 | $4.2 \times 10^8$ | | | 3.70 |
| 21 | $3.5 \times 10^8$ | | | 3.68 |

The amounts of lactic acid bacteria remained high and almost on the same level for the whole three-week storage. However, pH of the product was fairly low.

Sensory evaluation of this product was also Carried out; the results are given in Table 6. The evaluation was carried out on days 3, 7, 14 and 21. On the basis of the sensory evaluation the product was found to be good. It was a little ropy. The taste of the product was not too bitter or sour.

TABLE 6

Sensory evaluation of the product obtained by fermenting with starter mixture 2

| | Days of storage | | | | |
|---|---|---|---|---|---|
| | 3 | 7 | 14 | 21 | Mean |
| Appearance | 5.0 | 5.0 | 5.0 | 5.0 | 5.0 |
| Colour | 3.0 | 3.0 | 3.0 | 3.0 | 3.0 |
| Smell | 4.5 | 3.5 | 4.0 | 4.5 | 4.1 |
| Structure | 3.0 | 2.5 | 3.0 | 3.0 | 2.9 |
| Sourness | 2.6 | 3.0 | 3.0 | 3.8 | 3.1 |
| Bitterness | 3.0 | 3.5 | 3.5 | 1.2 | 2.8 |
| Total pleasantness | 4.5 | 4.5 | 4.0 | 4.0 | 4.3 |

Grading scales:
Appearance: 1 = very unpleasant, 5 = very pleasant
Colour: 1 = too pale, 5 = too dark
Smell: 1 = fusty, 5 = fresh
Structure: 1 = too ropy, 5 = not ropy
Sourness: 1 = not sour enough, 5 = too sour
Bitterness: 1 = not bitter at all, 5 = too bitter
Total pleasantness: 1 = very unpleasant, 5 = very pleasant Example 4

Supplementing Flaxseed with Oat and/or Buckwheat

We also studied the effect of oat or buckwheat flour as additional raw material. We used three different cereal mixtures and compared them to 5% crushed and milled flaxseed as raw material. Detection of pH and *Bifidobacterium* Bb12 count were carried out after 6-h fermenting at 37° C. and after 7- and 21-day refrigeration (4° C.). The results are given in Table 7.

TABLE 7

Change of pH and *Bifidobacterium* Bb12 count in fermented cereal mixture (flaxseed/oat/buckwheat) during 21-d storage.

| | 6 h fermentation | | 7 d refrigeration | | 21 d refrigeration | |
|---|---|---|---|---|---|---|
| Cereal mixture | Bb12 cfu/ml | pH | Bb12 cfu/ml | pH | Bb12 cfu/ml | pH |
| 60% flaxseed + 40% oat | $4 \times 10^7$ | 4.85 | $4 \times 10^7$ | 4.66 | $5 \times 10^7$ | 4.16 |
| 80% flaxseed + 20% oat | $4 \times 10^7$ | 4.86 | $4 \times 10^7$ | 4.74 | $4 \times 10^7$ | 4.70 |
| 60% flaxseed + 30% oat + 10% buckwheat | $5 \times 10^7$ | 4.69 | $5 \times 10^7$ | 4.56 | $5 \times 10^7$ | 4.36 |
| 100% flaxseed | $4 \times 10^7$ | 4.93 | $4 \times 10^7$ | 4.86 | $4 \times 10^7$ | 4.44 |
| YOSA organic red berries | $2 \times 10^7$ | 3.80 | | | | |

After 7 days of refrigeration pH was 4.7 to 4.9 in all cereal mixtures, which is promising considering the survival of the strain *Bifidobacterium* Bb12. The respective pH after 21 days of refrigeration was 4.2 to 4.6. The number of *Bifidobacterium* Bb12 remained on the level of $10^7$ cfu/ml. Differences between the cereal alternatives were small. As a comparison commercially available oat-based fermented product YOSA (Bioferme Oy, Kaarina, Finland) was used.

For the samples of Table 7 sensory evaluation was carried out both after 7 and 21 days. In none of the samples off-flavours appeared. However, slimy mouthfeel could be found in the sample containing 60% flaxseed, 30% oat and 10% buckwheat. Therefore, it seems that when using buckwheat, its concentration in the mixture should be lower than 10%.

Example 5

Stabilizing the Fermented Product

Since the coarse fraction separated onto the bottom after fermentation, it was necessary to stabilize the suspensions when preparing snack products. The following stabilizers were tested:

Pectin (Grinsted pectin LA 410, Danisco S/A, Denmark)

Guar gum (Uniferm Oy, Finland)

Guar gum+xanthan gum (PROVImel BG 101, Provisco AG, Switzerland)

Cellulose+guar gum (PROVImel BG 130, Provisco AG, Switzerland).

All of the stabilizers lead to a spoonable product. Mixture of guar gum and xanthan gum as well as pure guar gum acted well, but the mixture of cellulose and guar gum caused rubber-like feel. The amount of pectin was fairly high, which had deteriorating effect on the taste. The amounts of stabilizers used were from 1.0 to 1.5 g/100 g of the fermented suspension.

Example 6

Seasoning of the Fermented Flaxseed Product

To improve the taste of the product the fermented suspension was supplemented with mashed berries sweetened with sugar. In the primary test we used sugar-sweetened high-bush blueberry. The berry concentration in the suspension was 6%. Colour of the product was good, but it was necessary to add flavours to improve the taste. It was also necessary to add plenty of sugar. Other berries tested were lingonberry, blueberry, blackcurrant, sea buckthorn, rose hip and aronia. Frozen berries were mashed with a mixer stick, and sugar was added. Seeds were removed from rose hips and sea buckthorn. Concentrations of mashed berries in the suspensions varied from 15 to 22%. To improve the structure of the product guar gum and the mixture of guar gum and xanthan gum were used as stabilizers. Table 8 shows the results of the sensory evaluation.

TABLE 8

Sensory evaluation of the snack product prepared by fermenting flaxseed

| Sample | Concentration of mashed berries (%) | Stabilizer | Colour | Smell | Taste | Structure |
|---|---|---|---|---|---|---|
| Lingonberry | 16 | Guar gum | 3.5 | 3.4 | 2.7 | 3.8 |
| Blueberry | 22 | Guar gum | 4.0 | 3.4 | 3.1 | 3.8 |
| Blackcurrant | 15 | Guar gum + xanthan gum | 4.8 | 3.7 | 4.0 | 3.5 |
| Sea buckthorn + rose hip | 17 | Guar gum + xanthan gum | 2.4 | 3.1 | 2.9 | 3.5 |
| Lingonberry + aronia | 15 | Guar gum + xanthan gum | 4.6 | 3.5 | 3.3 | 3.7 |

Grading scale:
5 points - excellent
4 points - good
3 points - satisfactory
2 points - poor
1 point - not fit to eat The flaxseed product seasoned with blackcurrant was considered to be the best. It obtained best grades in colour, smell and taste. However, the structure of the product was considered to be too liquid, but this deficiency may be cured by increasing the amount of the stabilizer. For the most part the products were considered fairly good, but using flavours and may be also colouring agents it is possible to decrease the amount of berries and thereby lower the price of the product. It is also possible to use juice concentrates.

In addition, a test was carried out using mashed raspberry. The taste of the product was strong and raspberryish. The colour was beautifully red. The product obtained was considered to meet commercial requirements.

Example 7

Supplementing the Product with Flavours

The fermented snack products seasoned with mashed berries tasted berryish and their colour was beautiful, when the concentration of the mash in the suspension was about 15%. However, it is possible to decrease the production costs by supplementing the product with artificial or natural flavours or aromas in addition to berries. In such a case 8 to 10% of mashed berries would be sufficient. In addition, flavours and aromas help to keep the taste of the product unchanged during the whole shelf life.

The following aromas (Danisco S/A, Denmark) were studied:
Raspberry PF33123911
Raspberry-U25189
Blackcurrant PF33126686
Blackcurrant U25787
Blackcurrant U32823
Lingonberry PBU34090

Most of the aromas supported the taste provided by the berries fairly well. The amount of mashed berries in the product could be lowered to 8 to 10%. When doing this the colour of the flaxseed-raspberry product remained rather pale. However, this deficiency may be cured by adding a little mashed raspberry or a small amount of mashed aronia. It is also possible to add anthocyanins (E 163).

Example 8

Fermented Flaxseed Drink

Fermented flaxseed suspension was filtered to produce flaxseed drink. Filtering was carried out in successive steps using 500, 250, 224 and 180 μm sieves. The drink obtained still contained fine precipitate, wherefore it was necessary to use stabilizers. Primary seasoning was carried out with sea buckthorn juice sweetened with sugar. Juice concentration in the product was 5%. The taste was considered very good, and thus flaxseed is suitable raw material for preparing a drink as well.

Example 9

Monitoring of the Shelf Life of the Fermented Flaxseed Product

Sensory evaluation for the fermented flaxseed snack products seasoned with mashed berries and flaxseed drink seasoned with sea buckthorn juice was carried out weekly for four weeks. In Table 9 the results of shelf life monitoring are given. All other products remained unchanged except blackcurrant, the aroma of which weakened somewhat after two-week storage. In addition, in the sea buckthorn-rose hip product alcohol fermentation was found after three-week storage. In general, the products kept well for the three-week shelf life.

TABLE 9

Shelf life monitoring of flaxseed snack product seasoned with berries, and flaxseed-sea buckthorn drink

| Sample | Concentration of berries % | Colour, smell, taste and structure | | | |
|---|---|---|---|---|---|
| | | 1 week | 2 weeks | 3 weeks | 4 weeks |
| Lingonberry-aronia | 15 | normal | normal | normal | normal |
| Blackcurrant | 15 | normal | normal | aroma* | aroma* |
| Sea buckthorn-rose hip | 16 | normal | normal | normal | fermentation |

TABLE 9-continued

Shelf life monitoring of flaxseed snack product seasoned with berries, and flaxseed-sea buckthorn drink

| Sample | Concentration of berries % | Colour, smell, taste and structure | | | |
|---|---|---|---|---|---|
| | | 1 week | 2 weeks | 3 weeks | 4 weeks |
| Raspberry | 15 | normal | normal | normal | normal |
| Flaxseed-sea buckthorn drink | 5 | normal | normal | normal | normal |

*Aroma was weakened

Preparation Example 10

Preparation of Spoonable Flaxseed Snack Product

Defatted flaxseed were crushed and milled using a stone mill. 50 g of crushed and milled flaxseed and 15 g of glucose were mixed with 1000 ml of water and heated in a water bath of 70° C. for 30 minutes. The suspension obtained was cooled to 37° C. and inoculated (2% inoculum, v/v) with the mixture of starter strains *Bifidobacterium lactis* Bb12 (90%), *Lactobacillus acidophilus* LA-5 (5%) and *Lactobacillus rhamnosus* LC-705 (5%), the bacteria having been precultured in MRS-broth for 17 hours at 37° C. Fermentation was carried out at 37° C. for 6 hours. Bacterial count of Bb12 after 6-hour fermentation was $10^7$ cfu/ml and pH was 4.9. 100 g of mashed, sugar-sweetened raspberries were added to the suspension. Subsequently, 1.2 g of PROVImel BG 101 stabilizer (Provisco AG, Switzerland) was added per 100 g of the mixture. A tasty, spoonable snack product was obtained.

Comparative Example 11

Comparing Two Flaxseed Products Made Using Two Different Raw Materials

The purpose of this Example was to prepare two products according to the teachings of Example 2 of U.S. Pat. No. 4,857,326, using a "standard yogurt culture", but using two different raw materials, the first one being comparable to that described in said patent, and the second one being the raw material of the present invention. The first material used was thus flaxseed flour obtained by milling whole flaxseed which had not been defatted, and the second material was defatted, crushed flaxseed according to the present invention. Consequently, 15 parts of (1) full-fat flaxseed flour (VTT, Espoo, Finland) prepared by stone milling whole flaxseed or (2) defatted crushed flaxseed of the present invention were mixed with 100 parts of water. The mixtures were pasteurized in 250 ml bottles in a water bath (70° C., 30 min) and cooled to 30° C. Lyophilized commercially available starter culture YC-280 ($1.5 \times 10^8$ cfu/g)(Chr. Hansen, Hørsholm, Denmark), diluted with spring water, was added and the products were fermented for 8 hours at 30° C. The finished products were supplemented with mashed frozen blueberries (23 g/100 ml). The products were packed into 2 dl cups, à 1 dl, heat-sealed and stored at 4° C. for 22 days. The amounts of lactic acid bacteria, as well as pH values of the products were measured. The results are given in Tables 10 and 11.

TABLE 10

Lactic acid bacterial counts (cfu/g) on (MHB) MRS and M17 agar during the storage

| Days of storage | Sample | (MHB) MRS agar | M17 agar |
|---|---|---|---|
| 1 | (1) Flaxseed flour | $1.5 \times 10^8$ | $1.5 \times 10^8$ |
| | (2) Crushed flaxseed | $1.5 \times 10^8$ | $1.4 \times 10^8$ |
| 4 | (1) Flaxseed flour | $1.5 \times 10^8$ | $1.4 \times 10^8$ |
| | (2) Crushed flaxseed | $1.5 \times 10^8$ | $9.9 \times 10^7$ |
| 8 | (1) Flaxseed flour | $1.3 \times 10^8$ | $1.2 \times 10^8$ |
| | (2) Crushed flaxseed | $1.5 \times 10^8$ | $9.5 \times 10^7$ |
| 14 | (1) Flaxseed flour | $8.7 \times 10^7$ | $1.1 \times 10^8$ |
| | (2) Crushed flaxseed | $1.5 \times 10^8$ | $1.0 \times 10^8$ |
| 22 | (1) Flaxseed flour | $2.5 \times 10^7$ | $6.4 \times 10^7$ |
| | (2) Crushed flaxseed | $9.6 \times 10^7$ | $9.7 \times 10^7$ |

TABLE 11

Sourness (pH)

| | (1) Flaxseed flour | (2) Crushed flaxseed |
|---|---|---|
| Before adding the berries | 5.27 | 5.37 |
| After 2 weeks of storage | 4.17 | 4.49 |
| After 3 weeks of storage | 4.16 | 4.46 |

The amounts of lactic acid bacteria were somewhat decreased during the storage. Sensory evaluation of these products was carried out on days 4, 8, 14 and 22. The results are given in Tables 12a and 12b. Based on the sensory evaluation the products were considered still clearly unfinished. The structure of product (1) prepared using full-fat flaxseed flour was ropy like that of soured whole milk, and product (2) made of defatted crushed flaxseed was runny. The products were only mildly soured. The amount of flaxseed was threefold compared to that of the product of the invention. The concentration of cadmium and cyanogenic compounds may be come so high that it is a risk for security. The high amount of flaxseed could be tasted especially in the product prepared using full-fat flaxseed flour.

TABLE 12a

Sensory evaluation of comparative product (1)
(Full-fat flaxseed flour + blueberry)

| | Days of storage | | | | |
|---|---|---|---|---|---|
| | 4 | 8 | 14 | 22 | Mean |
| Appearance | 5.0 | 5.0 | 3.4 | — | 4.5 |
| Colour | 3.0 | 3.0 | 3.2 | — | 3.1 |
| Smell | 2.5 | 3.0 | 2.5 | 2.5 | 2.6 |
| Structure | 1.0 | 2.5 | 2.1 | 1.5 | 1.8 |
| Sourness | 3.0 | 3.0 | 3.2 | 3.1 | 3.1 |
| Bitterness | 2.5 | 3.5 | 3.5 | 4.0 | 3.4 |
| Total pleasantness | 2.5 | 2.5 | 1.7 | 2.4 | 2.3 |

TABLE 12b

Sensory evaluation of comparative product (2)
(Crushed flaxseed + blueberry)

|  | Days of storage | | | | |
| --- | --- | --- | --- | --- | --- |
|  | 4 | 8 | 14 | 22 | Mean |
| Appearance | 5.0 | 3.5 | 4.0 | — | 4.2 |
| Colour | 4.0 | 4.0 | 4.0 | — | 4.0 |
| Smell | 2.0 | 3.5 | 2.8 | 3.5 | 3.0 |
| Structure | 2.0 | 2.5 | 3.1 | 2.5 | 2.5 |
| Sourness | 3.0 | 2.5 | 2.8 | 2.7 | 2.8 |
| Bitterness | 2.0 | 3.5 | 3.0 | 3.1 | 2.9 |
| Total pleasantness | 2.5 | 2.0 | 3.5 | 3.2 | 2.8 |

Grading scales:
Appearance: 1 = very unpleasant, 5 = very pleasant
Colour: 1 = too pale, 5 = too dark
Smell: 1 = fusty, 5 = fresh
Structure: 1 = too ropy, 5 = not ropy
Sourness: 1 = not sour enough, 5 = too sour
Bitterness: 1 = not bitter at all, 5 = too bitter
Total pleasantness: 1 = very unpleasant, 5 = very pleasant

The invention claimed is:

1. A fermented flaxseed-based ready-to-eat snack product prepared by a process which comprises the steps of
   (a) defatting flaxseed to obtain defatted flaxseed,
   (b) crushing and milling the defatted flaxseed to obtain crushed and milled flaxseed,
   (c) mixing the crushed and milled flaxseed obtained at step (b), optionally supplemented with other cereals or plant seeds or flaxseed fractions, with water at a concentration of about 3 to about 8% (w/w) to obtain a suspension,
   (d) fermenting the suspension by a starter culture comprising the strain *Bifidobacterium lactis* Bb12 and/or the strain *Lactobacillus rhamnosus* GG (ATCC 53103), and
   (e) seasoning and stabilizing the product obtained at step (d).

2. The snack product according to claim 1, wherein the starter culture comprises the strain *Bifidobacterium lactis* Bb12 and/or strain *Lactobacillus rhamnosus* GG (ATCC 53103), supplemented with either *Lactobacillus rhamnosus* LC-705 or *Lactobacillus acidophilus* LA-5.

3. The snack product according to claim 1, wherein the crushed and milled flaxseed is mixed with water at a concentration of about 5%.

4. The snack product according to claim 1, wherein other cereals or plant seeds comprise oat, buckwheat and soy.

5. The snack product according to claim 1, wherein the flaxseed fractions comprise flaxseed-derived lignans, proteins or dietary fibres.

6. The snack product according to claim 1, wherein the snack product is a spoonable or drinkable flaxseed snack product comprising live or killed probiotic bacteria, or microbial cell preparations or components of microbial cells having probiotic characteristics.

7. A method of preparing a fermented flaxseed-based ready-to-eat snack product according to claim 1, comprising the steps of
   (a) defatting flaxseed to obtain defatted flaxseed,
   (b) crushing and milling the defatted flaxseed to obtain crushed and milled flaxseed,
   (c) mixing the crushed and milled flaxseed obtained at step (b), optionally supplemented with other cereals or plant seeds or flaxseed fractions, with water at a concentration of about 3 to about 8% (w/w) to obtain a suspension,
   (d) fermenting the suspension by a starter culture comprising the strain *Bifidobacterium lactis* Bb12 and/or the strain *Lactobacillus rhamnosus* GG (ATCC 53103), and
   (e) seasoning and stabilizing the product obtained at step (d).

8. The method according to claim 7, wherein the method comprises after step (d) an additional step of filtering the suspension to obtain a drinkable product.

9. The method according to claim 7, wherein the defatting of flaxseed is carried out by cold-pressing.

10. The method according to claim 7, wherein the seasoning is carried out using berries, jams, juices or fruit, and/or natural or artificial flavours or aromas.

11. The method according to claim 7, wherein the stabilizing is carried out using stabilizers selected from the group consisting of pectin, guar gum, xanthan gum and cellulose.

* * * * *